United States Patent
Lin et al.

(10) Patent No.: US 11,620,850 B1
(45) Date of Patent: Apr. 4, 2023

(54) FINGERPRINT SENSING DEVICE AND DRIVING METHOD FOR FINGERPRINT SENSING PANEL THEREOF

(71) Applicant: Novatek Microelectronics Corp., Hsinchu (TW)

(72) Inventors: Chun-Yen Lin, Hsinchu County (TW); Chi-Ting Chen, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/892,106

(22) Filed: Aug. 21, 2022

(51) Int. Cl.
*G06V 40/13* (2022.01)
*G06F 3/041* (2006.01)

(52) U.S. Cl.
CPC ........ *G06V 40/1318* (2022.01); *G06F 3/0412* (2013.01)

(58) Field of Classification Search
CPC ........ G06F 21/32; G06F 21/81; G06F 3/0412; G06V 40/13; G06V 40/12; G06V 40/1318
See application file for complete search history.

(56) References Cited

U.S. PATENT DOCUMENTS

| | | | | |
|---|---|---|---|---|
| 2010/0208953 A1* | 8/2010 | Gardner | ................. | G06V 40/12 382/124 |
| 2014/0198960 A1* | 7/2014 | Thompson | ............. | G06V 40/13 382/124 |
| 2018/0053034 A1* | 2/2018 | Merrell | .................... | G06F 21/32 |
| 2020/0167542 A1* | 5/2020 | Hu | ..................... | G06V 40/1365 |

* cited by examiner

*Primary Examiner* — Abhishek Sarma
(74) *Attorney, Agent, or Firm* — JCIPRNET

(57) ABSTRACT

A fingerprint sensing device and a driving method for a fingerprint sensing panel thereof are provided. The driving method includes: detecting whether a finger touch occurs on the fingerprint sensing panel; during a period of the finger touch, switching the brightness mode of the fingerprint sensing panel from a normal brightness mode to a high brightness mode so as to sense a fingerprint; driving the fingerprint sensing panel to sense the fingerprint before a mode switching time point at which the brightness mode of the fingerprint sensing panel is switched to the high brightness mode. The fingerprint sensing panel includes a pixel row, wherein the pixel row is subjected to a reset, an exposure period and a sampling in sequence to output a row sensing result, the reset is earlier than the mode switching time point, and the sampling is later than the mode switching time point.

24 Claims, 15 Drawing Sheets

FINGERPRINT SENSING DEVICE AND DRIVING METHOD FOR FINGERPRINT SENSING PANEL THEREOF

BACKGROUND

Technical Field

The invention relates to an electronic device, and particularly relates to a fingerprint sensing device and a driving method of a fingerprint sensing panel thereof.

Description of Related Art

Many electronic devices may sense and recognize fingerprints, and determine whether to unlock an electronic device according to a fingerprint recognition result. After a finger touches a fingerprint sensing panel, a brightness mode of the fingerprint sensing panel is switched from a normal brightness mode to a high brightness mode (HBM) to facilitate fingerprint sensing. Started from a time when the finger touches the fingerprint sensing panel, it takes a while (for example, tens of milliseconds) to switch from the normal brightness mode to the high brightness mode. The previous optical fingerprint recognition needs to wait for the high brightness mode to be ready before capturing the fingerprint (performing fingerprint sensing), resulting in a longer unlocking time.

SUMMARY

The invention is directed to a fingerprint sensing device and a driving method of a fingerprint sensing panel thereof, which are adapted to sense a fingerprint in advance before a mode switching time point of a brightness mode.

An embodiment of the invention provides a driving method of a fingerprint sensing panel including: detecting whether a finger touch occurs on the fingerprint sensing panel; during a period of the finger touch, switching a brightness mode of the fingerprint sensing panel from a normal brightness mode to a high brightness mode so as to sense a fingerprint; driving the fingerprint sensing panel to sense the fingerprint before a mode switching time point at which the brightness mode of the fingerprint sensing panel is switched to the high brightness mode. The fingerprint sensing panel includes a first pixel row, wherein the first pixel row is subjected to a first reset, a first exposure period and a first sampling in sequence to output a first row sensing result, the first reset is earlier than the mode switching time point, and the first sampling is later than the mode switching time point.

An embodiment of the invention provides a fingerprint sensing device including a fingerprint sensing panel and a driving circuit. The fingerprint sensing panel is used for sensing a fingerprint. The driving circuit is coupled to the fingerprint sensing panel to detect whether a finger touch occurs on the fingerprint sensing panel. The driving circuit controls the fingerprint sensing panel to switch a brightness mode of the fingerprint sensing panel from a normal brightness mode to a high brightness mode during a period of the finger touch, so as to sense the fingerprint. Before a mode switching time point at which the brightness mode of the fingerprint sensing panel is switched to the high brightness mode, the driving circuit drives the fingerprint sensing panel to sense the fingerprint. The fingerprint sensing panel includes a first pixel row, the first pixel row is subjected to a first reset, a first exposure period and a first sampling in sequence to output a first row sensing result, the first reset is earlier than the mode switching time point, and the first sampling is later than the mode switching time point.

Based on the above description, the driving circuit according to the embodiments of the invention may drive the fingerprint sensing panel to switch the brightness mode of the fingerprint sensing panel when a finger touches the fingerprint sensing panel so as to sense a fingerprint. In general, it takes a while for the brightness mode to be switched from the normal brightness mode to the high brightness mode. The driving circuit may sense the fingerprint in advance before the mode switching time point of the brightness mode.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
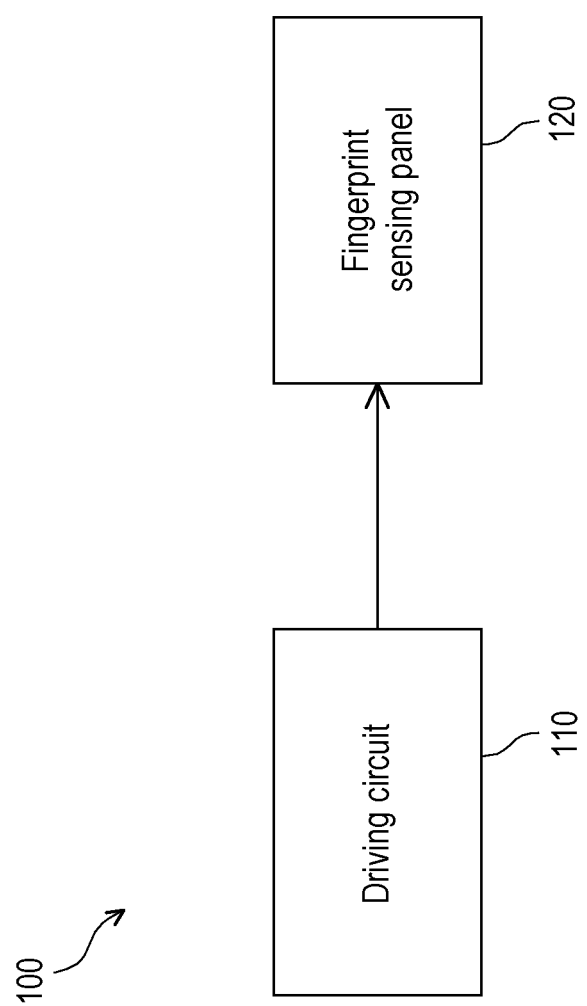
FIG. 1 is a schematic diagram of circuit blocks of a fingerprint sensing device according to an embodiment of the invention.

A term "couple" (or connect) used in the full text of the disclosure (including the claims) refers to any direct and indirect connections. For example, if a first device is described to be coupled (connected) to a second device, it is interpreted as that the first device is directly coupled to the second device, or the first device is indirectly coupled to the second device through other devices or connection means. "First", "second", etc. mentioned in the specification and the claims are merely used to name discrete components and should not be regarded as limiting the upper or lower bound of the number of the components, nor is it used to define a manufacturing order or setting order of the components. Moreover, wherever possible, components/members/steps using the same referential numbers in the drawings and description refer to the same or like parts. Components/members/steps using the same referential numbers or using the same terms in different embodiments may cross-refer related descriptions.

FIG. 1 is a schematic diagram of circuit blocks of a fingerprint sensing device 100 according to an embodiment of the invention. The fingerprint sensing device 100 includes a driving circuit 110 and a fingerprint sensing panel 120. The fingerprint sensing panel 120 may sense fingerprints. The driving circuit 110 is coupled to the fingerprint sensing panel 120 to detect whether a finger touch occurs on the fingerprint sensing panel 120.

According to different design requirements, in some embodiments, the driving circuit 110 may be implemented by a hardware circuit. In other embodiments, the implementation of the driving circuit 110 may be firmware, software (i.e. a program), or a combination thereof. In still other embodiments, the implementation of the driving circuit 110 may be a combination of hardware, firmware, and software.

In terms of hardware, the driving circuit 110 may be implemented as a logic circuit on an integrated circuit. For example, related functions of the driving circuit 110 may be implemented as various logic blocks, modules and circuits in one or more controllers, microcontrollers, microprocessors, application-specific integrated circuits (ASICs), digital signal processors (DSPs), field programmable gate arrays (FPGAs) and/or other processing units. The related functions of the driving circuit 110 may be implemented as hardware circuits, for example, various logic blocks, modules and circuits in an integrated circuit by using a hardware description language (such as Verilog HDL or VHDL) or other suitable programming languages.

In the form of software and/or firmware, the related functions of the driving circuit 110 may be implemented as programming codes. For example, the driving circuit 110 is implemented by using a general programming language (for example, C, C++, or assembly languages) or other suitable programming languages. The programming code may be recorded/stored in a "non-transitory computer readable medium". In some embodiments, the non-transitory computer-readable medium includes, for example, a semiconductor memory and/or a storage device. The semiconductor memory includes a memory card, a read only memory (ROM), a flash memory, a programmable logic circuit or other semiconductor memories. The storage device includes a tape, a disk, a hard disk drive (HDD), a solid-state drive (SSD), or other storage devices. An electronic device (such as a computer, a central processing unit (CPU), a controller, a microcontroller or a microprocessor) may read the programming code from the non-transitory computer-readable medium and execute the same, so as to realize the related functions of the driving circuit 110.

Figure 2:
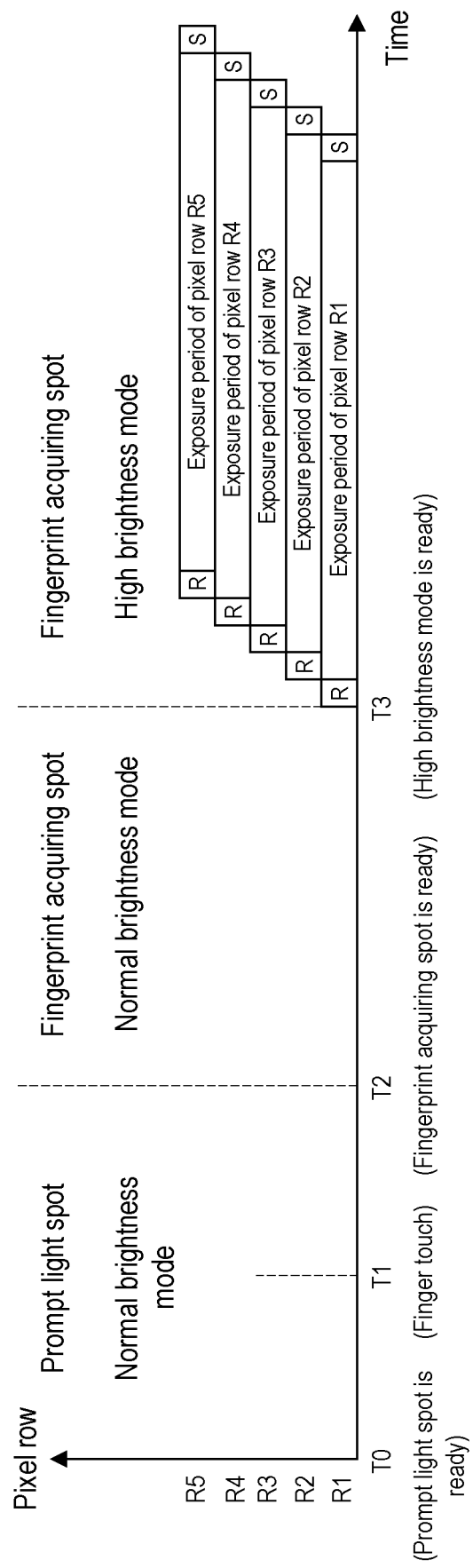
FIG. 2 is a schematic timing diagram of the fingerprint sensing device performing fingerprint capturing (fingerprint sensing) according to an embodiment of the invention.

FIG. 2 is a schematic timing diagram of the fingerprint sensing device 100 performing fingerprint capturing (fingerprint sensing) according to an embodiment of the invention. A horizontal axis of FIG. 2 represents time, and a vertical axis represents pixel row (or image row). FIG. 2 illustrates an operation timing of pixel rows R1, R2, R3, R4 and R5 of the fingerprint sensing panel 120. However, the number of pixel rows of the fingerprint sensing panel 120 may be determined according to an actual design. Based on control and driving of the driving circuit 110, the fingerprint sensing panel 120 may perform a rolling shutter operation to capture a fingerprint image.

In the embodiment shown in FIG. 2, the fingerprint sensing panel 120 has a display function, a touch detection function and a fingerprint sensing function. The driving circuit 110 may drive the fingerprint sensing panel 120 to display a prompt light spot (the fingerprint sensing device 100 is ready with the prompt light spot at a time point T0). The prompt light spot may prompt a fingerprint sensing region of the fingerprint sensing panel 120. In order to avoid stimulating the user's eyes due to an excessive brightness of the prompt light spot, the driving circuit 110 will not turn on a high brightness mode (HBM) of the fingerprint sensing panel 120 during a period of displaying the prompt light spot, but sets a brightness mode of the fingerprint sensing panel 120 to a normal brightness mode. An actual brightness of the normal brightness mode may be set by a user. An actual brightness of the high brightness mode is greater than the brightness of the normal brightness mode. The actual brightness of the high brightness mode may be determined according to an actual design. For example, in some embodiments, the brightness of the high brightness mode may be the maximum brightness of the fingerprint sensing panel 120.

The driving circuit 110 may also use the fingerprint sensing panel 120 to detect whether a finger touch occurs on the fingerprint sensing panel 120. It is assumed that the user's finger touches the fingerprint sensing region of the fingerprint sensing panel 120 at a time point T1. After the finger presses the prompt light spot (the fingerprint sensing region), the driving circuit 110 may detect the finger touch through the fingerprint sensing panel 120. After confirming the finger touch, the driving circuit 110 may switch a brightness mode of the fingerprint sensing panel 120 from the normal brightness mode to the high brightness mode so as to sense the fingerprint (improve imaging quality of the fingerprint), and meanwhile the driving circuit 110 may also switch the prompt light spot of the fingerprint sensing panel 120 to a fingerprint acquiring spot (a light spot without an image) to prevent the image from affecting the fingerprint imaging. In an actual situation, it takes time to "switch the brightness mode from the normal brightness mode to the high brightness mode" and "switch the light spot from the prompt light spot to the fingerprint acquiring spot".

Generally, switching light spot is faster than switching brightness mode. A time point T2 shown in FIG. 2 represents a time point of "the light spot is switched to the fingerprint acquiring spot" (the fingerprint acquiring spot is ready), and a time point T3 shown in FIG. 2 is a time point of "the brightness mode is switched to the high brightness mode" (the high brightness mode is ready). For example, a time length from the time point T1 to the time point T2 is usually one frame time. If a frame rate is 120 Hz, the one frame time is about 8.33 ms. A time length from the time point T1 to the time point T3 is usually about several tens of milliseconds. After the high brightness mode is ready, i.e., after the time point T3, the driving circuit 110 drives the fingerprint sensing panel 120 to capture a fingerprint image. In the embodiment shown of FIG. 2, "R" represents a reset operation of a pixel row, "S" represents a sampling operation of a pixel row, and a time between the reset R and the sampling S represents an exposure period of one pixel row.

From the time point T1 (the finger touches the fingerprint sensing panel 120) to the time point T3, the fingerprint sensing panel 120 does not perform a fingerprint image capturing operation during this period. Optical fingerprint recognition needs to wait for the high brightness mode to be ready before capturing the fingerprint (fingerprint sensing), which results in a longer unlocking time. If the period from the time point T1 to the time point T3 may be shortened, the unlocking time may be effectively shortened. The following embodiments will illustrate that when the finger touches the fingerprint sensing panel 120 and before the high brightness mode is ready, the fingerprint sensing panel 120 performs the fingerprint sensing operation in advance.

Figure 3:
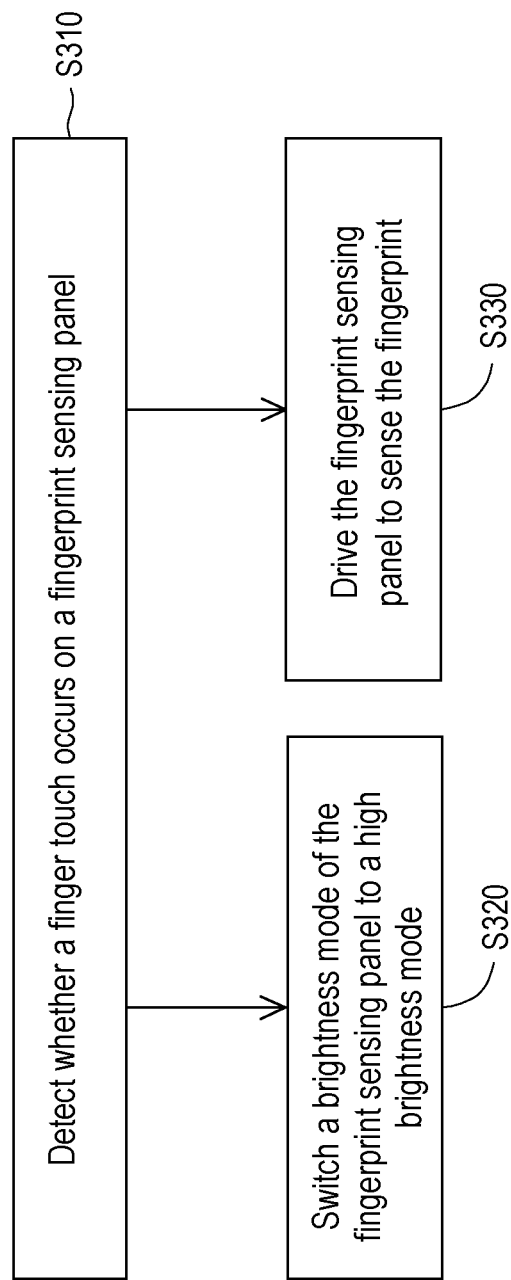
FIG. 3 is a schematic flowchart of a driving method of a fingerprint sensing panel according to an embodiment of the invention.

FIG. 3 is a schematic flowchart of a driving method of a fingerprint sensing panel according to an embodiment of the invention. Referring to FIG. 1 and FIG. 3, the driving circuit 110 may detect whether a finger touch occurs on the fingerprint sensing panel 120 through the fingerprint sensing panel 120 (step S310). After confirming that the finger touch occurs, the driving circuit 110 may control the fingerprint sensing panel 120 to switch the brightness mode of the fingerprint sensing panel 120 from the normal brightness mode to the high brightness mode during the period of the finger touch (step S320) to facilitate sensing fingerprint. In an actual situation, it takes a while to "switch the brightness mode from the normal brightness mode to the high brightness mode". Before the brightness mode of the fingerprint sensing panel 120 is switched to the high brightness mode (for example, before the time point T3), the driving circuit 110 may drive the fingerprint sensing panel 120 to sense the fingerprint (step S330).

Figure 4:
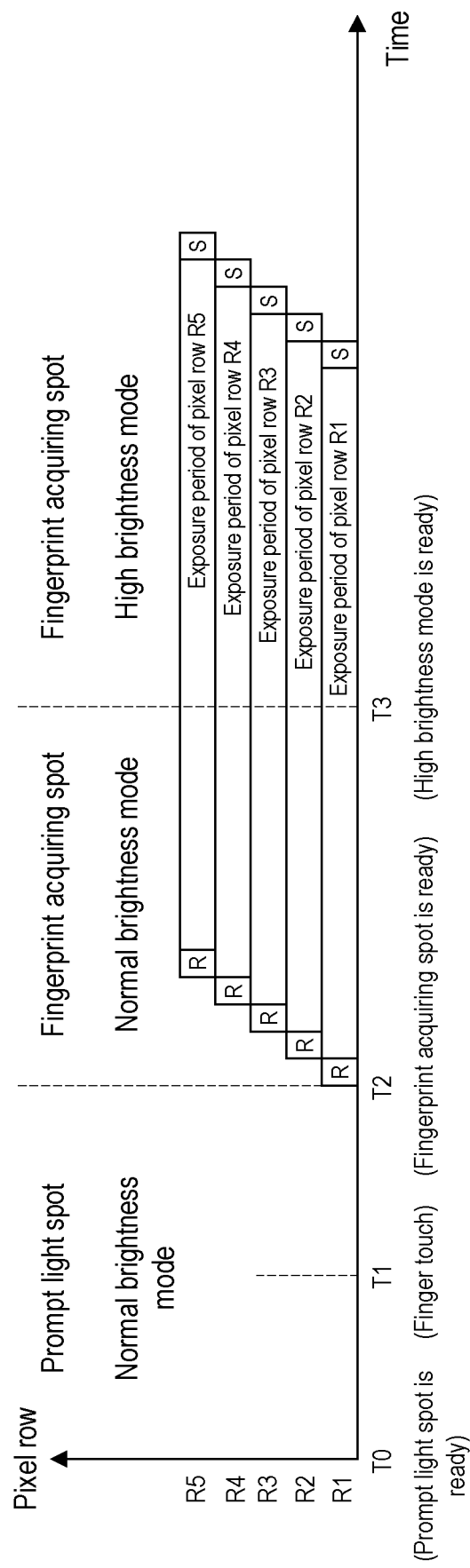
FIG. 4 is a schematic timing diagram of the fingerprint sensing device performing fingerprint capturing (fingerprint sensing) according to an embodiment of the invention.

FIG. 4 is a schematic timing diagram of the fingerprint sensing device 100 performing fingerprint capturing (fingerprint sensing) according to an embodiment of the invention. A horizontal axis of FIG. 4 represents time, and a vertical axis represents pixel row (or image row). Before the finger touch of the fingerprint sensing panel 120 is occurred, the driving circuit 110 may drive the fingerprint sensing panel 120 to display the prompt light spot to prompt the fingerprint sensing region of the fingerprint sensing panel 120. During the period of the finger touch, the driving circuit 110 may drive the fingerprint sensing panel 120 to display a fingerprint acquiring spot so as to sense the fingerprint.

Description of the timing diagram shown in FIG. 4 may be deduced by referring to the related description of the timing diagram shown in FIG. 2, so that detail thereof is not repeated. Different from the embodiment shown in FIG. 2, in the embodiment shown in FIG. 4, before the high brightness mode is ready (time point T3), the fingerprint sensing panel 120 performs the fingerprint sensing operation in advance based on the driving of the driving circuit 110 (step S330). For example, the fingerprint sensing panel 120 performs the fingerprint sensing operation immediately after the fingerprint acquiring spot is ready (time point T2). Taking a pixel row R1 of the fingerprint sensing panel 120 as an example, the pixel row R1 is subjected to the reset R, the exposure period and the sampling S in sequence to output a row sensing result, where the reset R of the pixel row R1 is earlier than the time point T3 (a mode switching time point), and the sampling S of the pixel row R1 is later than the time point T3. In this way, the fingerprint sensing device 100 may greatly reduce a time spent on image capturing. Taking FIG. 4 as an example, the time is approximately reduced by (T3−T2).

Figure 5:
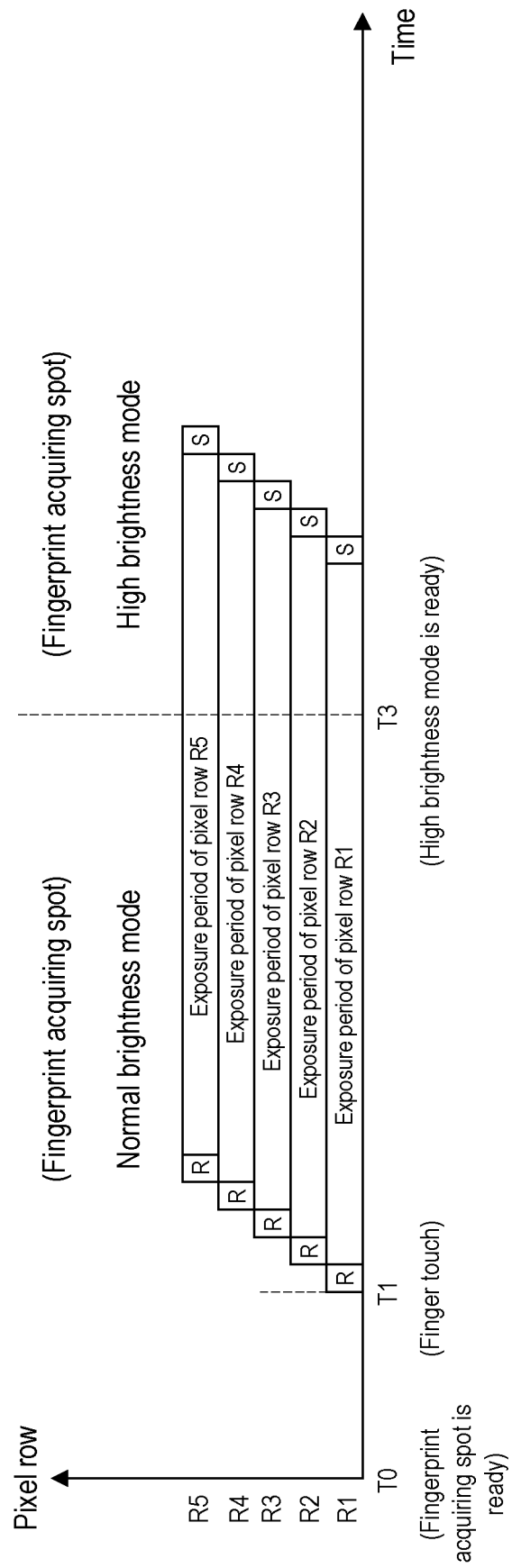
FIG. 5 is a schematic timing diagram of the fingerprint sensing device performing fingerprint capturing (fingerprint sensing) according to another embodiment of the invention.

FIG. 5 is a schematic timing diagram of the fingerprint sensing device 100 performing fingerprint capturing (fingerprint sensing) according to another embodiment of the invention. A horizontal axis of FIG. 5 represents time, and a vertical axis represents pixel row (image row). Description of the timing diagram shown in FIG. 5 may be deduced by referring to the related description of the timing diagram shown in FIG. 4, and thus detail thereof is not repeated. Different from the embodiment shown in FIG. 4, the fingerprint sensing panel 120 of the embodiment shown in FIG. 5 does not need to display the prompt light spot. Namely, the fingerprint sensing device 100 may prepare the fingerprint acquiring spot at the time point T0. In order to avoid that the brightness of the prompt light spot is too bright to stimulate the user's eyes, the driving circuit 110 sets the brightness mode of the fingerprint sensing panel 120 to the normal brightness mode after the time point T0. In other embodiments, the fingerprint sensing panel 120 may not have a display function, but has a touch detection function, a fingerprint sensing function, and a light-emitting function. The relevant description of FIG. 5 may also be adapted to the fingerprint sensing panel 120 without the display function.

After the finger presses the fingerprint acquiring spot (the fingerprint sensing region), i.e., at the time point T1, the driving circuit 110 may detect the finger touch via the fingerprint sensing panel 120 (step S310). After confirming the finger touch, the driving circuit 110 may switch the brightness mode of the fingerprint sensing panel 120 from the normal brightness mode to the high brightness mode (step S320) to facilitate fingerprint sensing. It is assumed here that the fingerprint sensing panel 120 cannot be ready for the high brightness mode until the time point T3 (the mode switching time point). In the embodiment shown in FIG. 5, the fingerprint sensing panel 120 performs the fingerprint sensing operation immediately after the finger presses the fingerprint sensing region (at the time point T1) of the fingerprint sensing panel 120 (step S330). Taking the pixel row R1 of the fingerprint sensing panel 120 as an example, the reset R of the pixel row R1 is earlier than the time point T3 (the mode switching time), and the sampling S of the pixel row R1 is later than the time point T3. Compared with the embodiment shown in FIG. 2, the time taken for image acquisition of the fingerprint sensing device 100 in the embodiment shown in FIG. 5 may be substantially reduced by (T3−T1).

Figure 6:
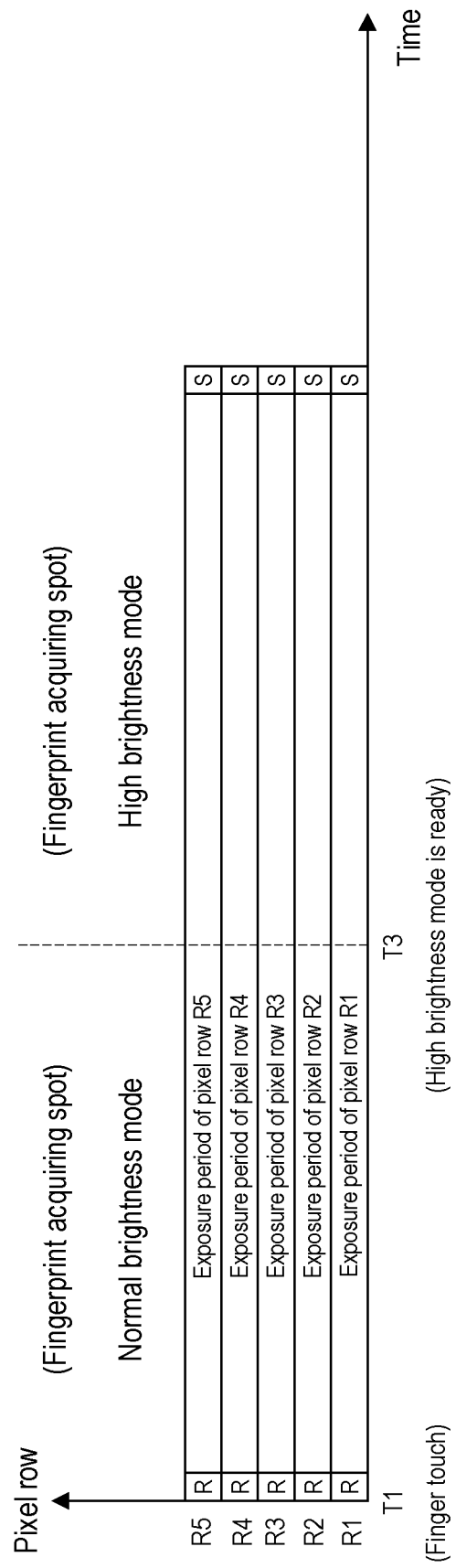
FIG. 6 is a schematic timing diagram of the fingerprint sensing device performing fingerprint capturing (fingerprint sensing) according to still another embodiment of the invention.

FIG. 6 is a schematic timing diagram of the fingerprint sensing device 100 performing fingerprint capturing (fingerprint sensing) according to still another embodiment of the invention. A horizontal axis of FIG. 6 represents time, and a vertical axis represents pixel row (image row). Description of the timing diagram shown in FIG. 6 may be deduced by referring to the related description of the timing diagram shown in FIG. 5, and thus detail thereof is not repeated. Different from the embodiment shown in FIG. 5, based on control and driving of the driving circuit 110, the fingerprint sensing panel 120 of the embodiment shown in FIG. 6 may perform a global shutter operation to capture a fingerprint image.

After the finger presses the fingerprint acquiring spot (the fingerprint sensing region), i.e., at the time point T1 shown in FIG. 6, the driving circuit 110 may detect the finger touch via the fingerprint sensing panel 120 (step S310). After confirming the finger touch, the driving circuit 110 may switch the brightness mode of the fingerprint sensing board 120 from the normal brightness mode to the high brightness mode (step S320) to facilitate fingerprint sensing. It is assumed that the fingerprint sensing panel 120 cannot be ready for the high brightness mode until the time point T3 (the mode switching time point) shown in FIG. 6. In the embodiment shown in FIG. 6, the fingerprint sensing panel 120 performs the fingerprint sensing operation immediately after the finger presses the fingerprint sensing region of the fingerprint sensing panel 120 (the time point T1) (step S330). Taking the pixel rows R1-R5 of the fingerprint sensing panel 120 as an example, the pixel rows R1-R5 are subjected to the reset R, the exposure period and the sampling S in sequence to output sensing results of different rows, where the time points of the resets R of the pixel rows R1-R5 are the same as each other, and the time points of the samplings S of the pixel rows R1-R5 are the same as each other. The resets R of the pixel rows R1-R5 are earlier than the time point T3 (the mode switching time point), and the samplings S of the pixel rows R1-R5 are later than the time point T3.

Figure 7:
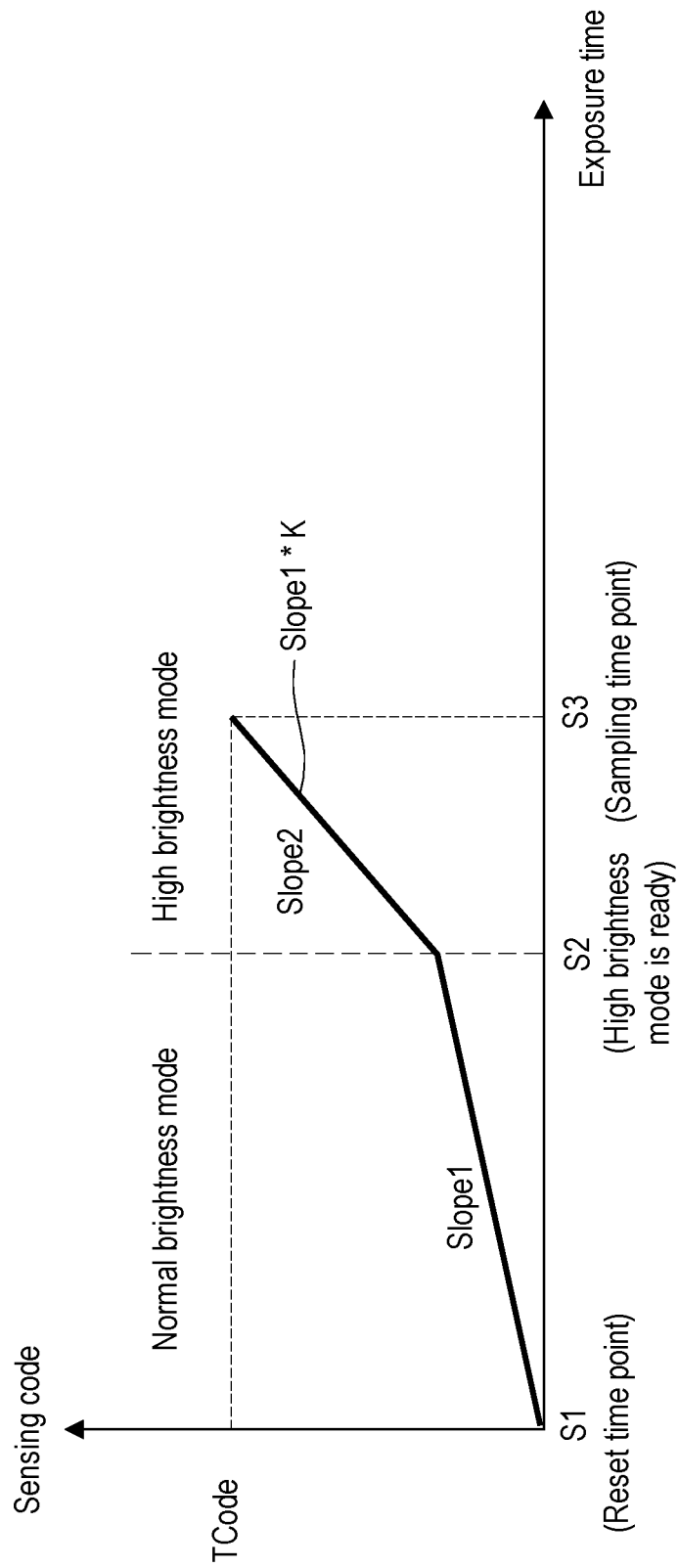
FIG. 7 is a schematic diagram of a relationship curve between exposure time and sensing code during an exposure period of one pixel row of the fingerprint sensing panel according to an embodiment of the invention.

FIG. 7 is a schematic diagram of a relationship curve between exposure time and sensing code during an exposure period of one pixel row of the fingerprint sensing panel 120 according to an embodiment of the invention. A horizontal axis of FIG. 7 represents time, and a vertical axis represents the sensing code. The sensing code corresponds to a row sensing result (exposure result) of one pixel row. For any one of the pixel rows R1-R5 shown in FIG. 4, FIG. 5 or FIG. 6, reference may be made to the relevant description of FIG. 7. A mode switching time point S2 shown in FIG. 7 may represent the time point T3 shown in FIG. 4, FIG. 5 or FIG. 6. Time points S1 and S3 shown in FIG. 7 may respectively represent time points of the reset R and the sampling S of one pixel row.

The driving circuit 110 may calculate following equations (1) and (2). In the equation (1), K is a brightness ratio between the high brightness mode and the normal brightness mode, Slope1 is a first slope of the relationship curve shown in FIG. 7 before the mode switching time point S2, and Slope2 is a second slope of the relationship curve shown in FIG. 7 after the mode switching time point S2. Under the condition that the first slope Slope1 and the brightness ratio K are known, the driving circuit 110 may calculate the equation (1) to obtain the second slope Slope2. In the equation (2), S1 is a reset time point of one pixel row (a time point of the reset R), S2 is the mode switching time point, S3 is a sampling time point of one pixel row (a time point of the sampling S), and TCode is a target sensing code. The target sensing code TCode corresponds to target exposure of the fingerprint sensing panel 120. When the target sensing code TCode, the mode switching time point S2, the second slope Slope2, the reset time point S1 and the first slope Slope1 are known, the driving circuit 110 may calculate the equation (2) to obtain a sampling time point S3. The sampling time point S3 is a time point of the sampling S of one pixel row.

$$\text{Slope2} = \text{Slope1} * K \qquad \text{Equation (1)}$$

$$T\text{Code} = (S3 - S2) * \text{Slope2} + (S2 - S1) * \text{Slope1} \qquad \text{Equation (2)}$$

In some applications, a brightness of the normal brightness mode may be dynamically adjusted by the user, causing the first slope Slope1 to drift. In the case that the first slope Slope1 is not determined, the driving circuit 110 may first detect the first slope Slope1 of the current normal brightness mode after the time point T1 (the finger touches the fingerprint sensing panel 120), and then perform the related operations of FIG. 7.

Figure 8:
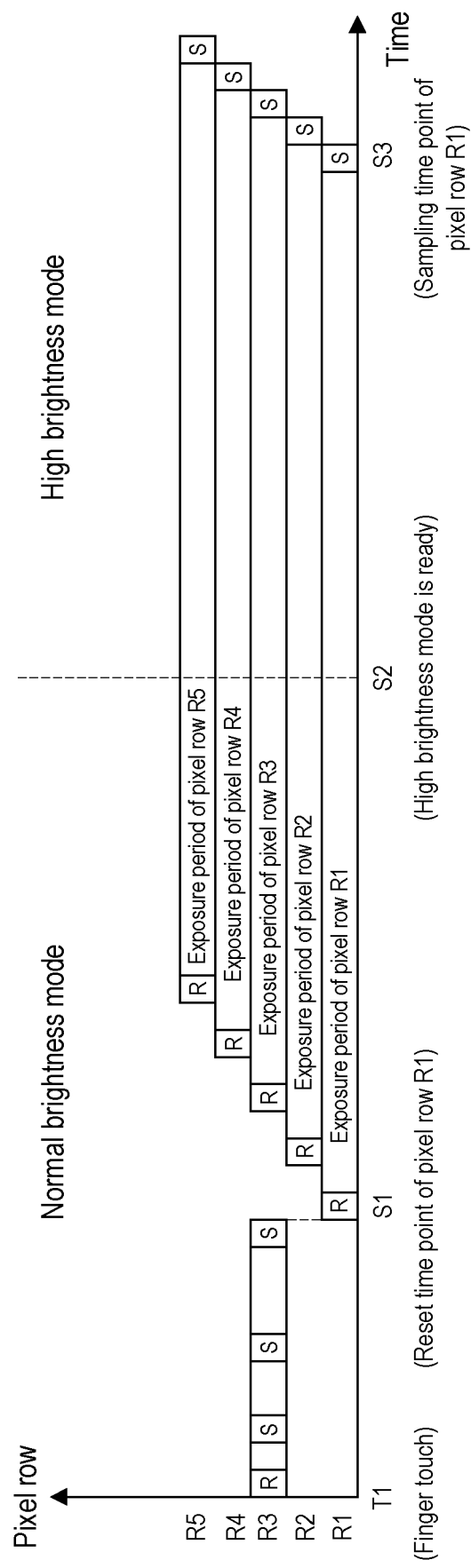
FIG. 8 is a schematic timing diagram of the fingerprint sensing device performing fingerprint capturing (fingerprint sensing) according to yet another embodiment of the invention.

FIG. 8 is a schematic timing diagram of the fingerprint sensing device 100 performing fingerprint capturing (fingerprint sensing) according to yet another embodiment of the invention. A horizontal axis of FIG. 2 represents time, and a vertical axis represents pixel row (or image row). Description of the timing diagram shown in FIG. 8 may be deduced by referring to the related description of the timing diagram shown in FIG. 5, and thus detail thereof is not repeated. Different from the embodiment shown in FIG. 5, based on the control and driving of the driving circuit 110, the fingerprint sensing panel 120 of the embodiment shown in FIG. 8 may first detect the first slope Slope1 of the current normal brightness mode after the time point T1, and then perform the related operations in FIG. 5 and FIG. 7. The mode switching time point S2 shown in FIG. 8 may be deduced by referring to the relevant description of the time point T3 shown in FIG. 5.

Referring to FIG. 8, before the mode switching time point S2, the driving circuit 110 may drive at least one pixel row (for example, the pixel row R3) of the fingerprint sensing panel 120 to perform the reset R and a plurality of samplings S in sequence to obtain a plurality of exposure sensing results (a plurality of sensing codes). The driving circuit 110 may use the exposure sensing results to calculate the first slope Slope1 of the current normal brightness mode. After determining the current first slope Slope1, the driving circuit 110 may perform the related operations in FIG. 7 to obtain the sampling time point S3 of the pixel row R1. The timings of the resets R and the samplings S of the other pixel rows R2-R5 may be adaptively adjusted based on the reset time point S1 and the sampling time point S3 of the pixel row R1, so that the equivalent exposure time of each pixel row is consistent with each other as much as possible. The following embodiments will describe an example of timing adjustment of the reset R and the sampling S of the pixel rows R1-R5 shown in FIG. 4, FIG. 5 or FIG. 8.

Figure 9:
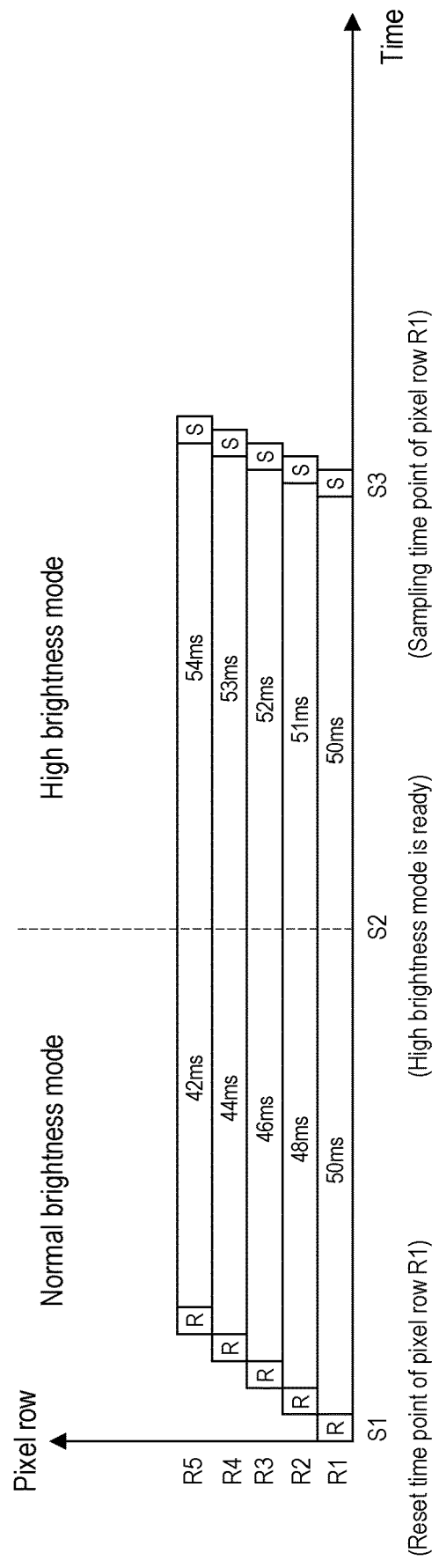
FIG. 9 is a schematic diagram of adaptively adjusting sampling timings of pixel rows according to an embodiment of the invention.

FIG. 9 is a schematic diagram of adaptively adjusting timings of the samplings S of the pixel rows R1-R5 according to an embodiment of the invention. A horizontal axis of FIG. 9 represents time, and a vertical axis represents pixel row (image row). Description of the timing diagram shown in FIG. 9 may be deduced by referring to the related description of the timing diagram shown in FIG. 4, FIG. 5 or FIG. 8, so that detail thereof is not repeated. The pixel rows R1-R5 are respectively subjected to the reset R, an exposure period, and the sampling S in sequence to output sensing results of different rows. The reset R of the pixel rows R1-R5 is earlier than the mode switching time point S2, and the sampling S of the pixel rows R1-R5 is later than the mode switching time point S2. In the embodiment shown in FIG. 9, the timings of the samplings S of the pixel rows R2-R5 may be adaptively adjusted based on the sampling time point S3 of the pixel row R1, so that the equivalent exposure times of each of the pixel rows are as consistent as possible.

In the embodiment shown in FIG. 9, the brightness ratio K of the high luminance mode to the normal luminance mode is assumed to be 2. For example, the brightness of the high brightness mode is 100%, while the brightness of the normal brightness mode is 50%. The reset R of the pixel row R2 is later than the reset R of the pixel row R1 by one unit time, the reset R of the pixel row R3 is later than the reset R of the pixel row R2 by one unit time, the reset R of the pixel row R4 is later than the reset R of the pixel row R3 by one unit time, and the reset R of the pixel row R5 is later than the reset R of the pixel row R4 by one unit time. Here, one unit time may be a time length of the reset R and/or the sampling S. The sampling S of the pixel row R2 is later than the sampling S of the pixel row R1 by ½ (1/K) of the unit time, and the sampling S of the pixel row R3 is later than the sampling S of the pixel row R2 by ½ of the unit time. The sampling S of the pixel row R4 is later than the sampling S of the pixel row R3 by one-half of the unit time, and the sampling S of the pixel row R5 is later than the sampling S of the pixel row R4 by one-half of the unit time.

Taking the pixel row R1 as an example, it is assumed that the exposure time before and after the mode switching time point S2 is 50 ms and 50 ms respectively, which is equivalent to the exposure time at 100% brightness: 50/2+50=75 ms. It is assumed here that one unit time is 2 ms. The sampling S of the pixel row R2 shown in FIG. 9 is advanced by one-half of the unit time, so that the exposure time before and after the mode switching time point S2 is 48 ms and 51 ms respectively, which is equivalent to the exposure time at 100% brightness: 48/2+51=75 ms. For the remaining pixel rows R3-R5, reference may be made to the relevant description of the pixel row R2, as shown in FIG. 9. Based on this, each of the pixel rows R1-R5 is equivalent to an exposure time of 75 ms at 100% brightness, so that the driving circuit 110 may capture a uniform fingerprint image.

Figure 10:
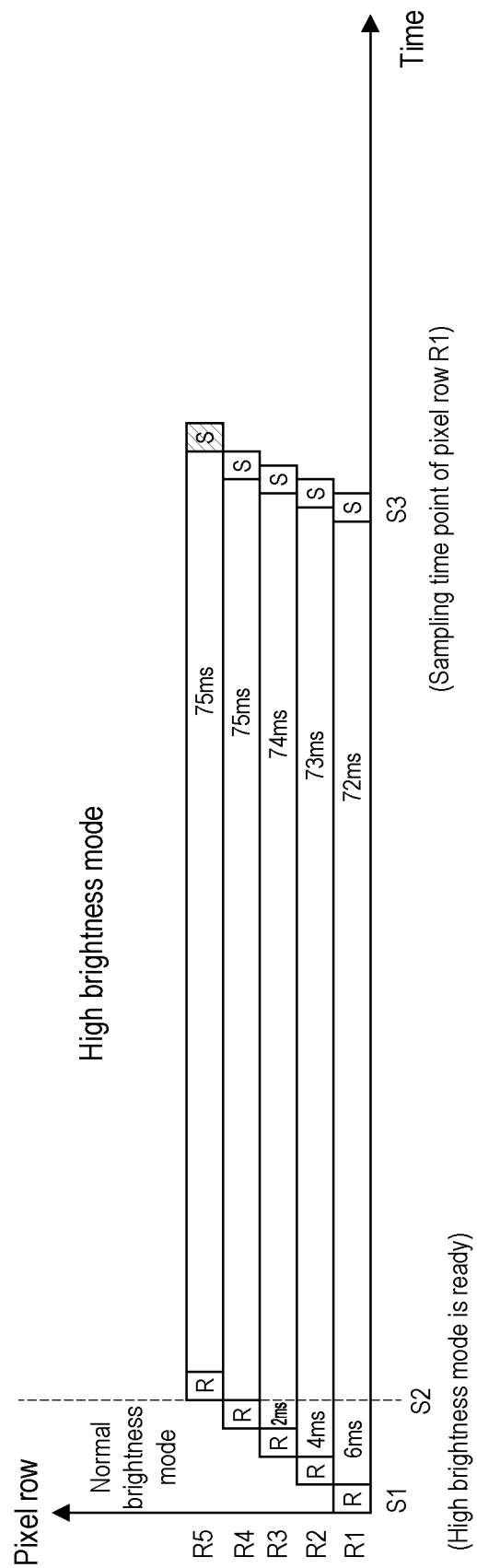
FIG. 10 is a schematic diagram of adaptively adjusting sampling timings of the pixel rows according to another embodiment of the invention.

FIG. 10 is a schematic diagram of adaptively adjusting timings of the samplings S of the pixel rows R1-R5 according to another embodiment of the invention. A horizontal axis of FIG. 10 represents time, and a vertical axis represents pixel row (image row). Description of the timing diagram shown in FIG. 10 may be deduced by referring to the related description of the timing diagram shown in FIG. 4, FIG. 5, FIG. 8 or FIG. 9, so that detail thereof is not repeated here. For the pixel rows R1-R5 shown in FIG. 10, reference may be made to the related description of the pixel rows R1-R5 shown in FIG. 9. The difference from the embodiment shown in FIG. 9 is that the reset R and the sampling S of the pixel row R5 shown in FIG. 10 are both later than the mode switching time point S2. In the embodiment shown in FIG. 10, the reset R of the pixel row R5 is later than the reset R of the pixel row R4 by one unit time, and the sampling S of the pixel row R5 is later than the sampling S of the pixel row R4 by one unit time. In the embodiment shown in FIG. 10, the timings of the samplings of the pixel rows R2-R5 may be adaptively adjusted based on the sampling time point S3 of the pixel row R1, so that the equivalent exposure times of each pixel row are as consistent as possible.

Taking the pixel row R1 as an example, it is assumed that the exposure time before and after the mode switching time point S2 is 6 ms and 72 ms respectively, which is equivalent to the exposure time at 100% brightness: 6/2+72=75 ms. It is assumed here that one unit time is 2 ms, the brightness of the high brightness mode is 100%, and the brightness of the normal brightness mode is 50%. The sampling S of the pixel row R2 shown in FIG. 10 is advanced by one-half of the unit time, so that the exposure time before and after the mode switching time point S2 is 4 ms and 73 ms respectively, which is equivalent to the exposure time at 100% brightness: 4/2+73=75 ms. For the pixel row R3, the exposure time before and after the mode switching time point S2 is 2 ms and 74 ms respectively, which is equivalent to the exposure time at 100% brightness: 2/2+74=75 ms. For the pixel row R4, the exposure time before and after the mode switching time point S2 is 0 ms and 75 ms respectively, which is equivalent to the exposure time at 100% brightness: 0/2+75=75 ms. Since the reset R of the pixel row R5 is performed after the mode switching time point S2, the sampling S of the pixel row R5 does not need to be advanced by one-half of the unit time. Based on this, each of the pixel rows R1-R5 is equivalent to an exposure time of 75 ms at 100% brightness, so that the driving circuit 110 may capture a uniform fingerprint image.

Figure 11:
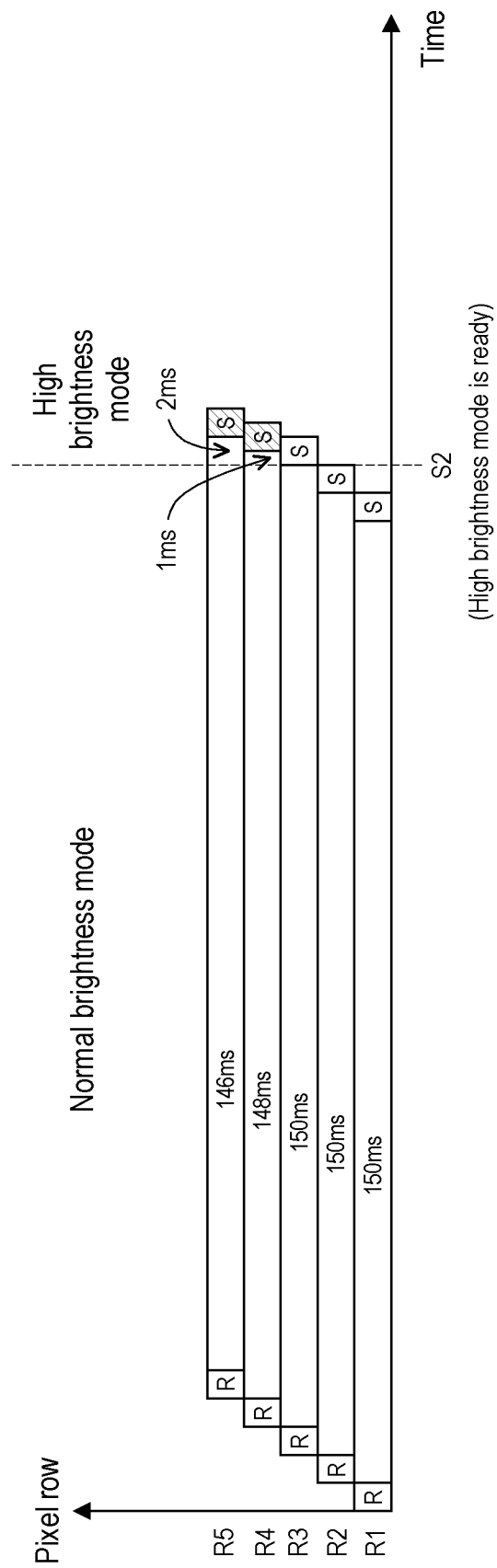
FIG. 11 is a schematic diagram of adaptively adjusting sampling timings of the pixel rows according to still another embodiment of the invention.

FIG. 11 is a schematic diagram of adaptively adjusting timings of the samplings S of the pixel rows R1-R5 according to still another embodiment of the invention. A horizontal axis of FIG. 11 represents time, and a vertical axis represents pixel row (image row). Description of the timing diagram shown in FIG. 11 may be deduced by referring to the related description of the timing diagram shown in FIG. 4, FIG. 5, FIG. 8 or FIG. 9, and detail thereof is not repeated here. For the pixel rows R1-R5 shown in FIG. 11, reference may be made to the related description of the pixel rows R1-R5 shown in FIG. 9. Different from the embodiment shown in FIG. 9, the reset R and the sampling S of the pixel rows R1-R2 shown in FIG. 11 are earlier than the mode switching time point S2. In the embodiment shown in FIG. 11, the reset R of the pixel row R2 is earlier than the reset R of the pixel row R3 by one unit time, and the reset R of the pixel row R1 is earlier than the reset R of the pixel row R2 by one unit time. The sampling S of the pixel row R2 is earlier than the sampling S of the pixel row R3 by one unit time, and the sampling S of the pixel row R1 is earlier than the sampling S of the pixel row R2 by one unit time. In the embodiment shown in FIG. 11, the timings of the samplings of the pixel rows R2-R5 may be adaptively adjusted based on the sampling time point S3 of the pixel row R1, so that the equivalent exposure times of each pixel row are as consistent as possible.

Taking the pixel rows R1-R3 as an example, it is assumed that the exposure time before and after the mode switching time point S2 is 150 ms and 0 ms respectively, which is equivalent to the exposure time at 100% brightness: 150/2+0=75 ms. It is assumed here that one unit time is 2 ms, the brightness of the high brightness mode is 100%, and the brightness of the normal brightness mode is 50%. The sampling S of the pixel row R4 shown in FIG. 11 is advanced by one-half of the unit time, so that the exposure time before and after the mode switching time point S2 is 148 ms and 1 ms respectively, which is equivalent to the exposure time at 100% brightness: 148/2+1=75 ms. For the pixel row R5, the exposure time before and after the mode switching time point S2 is 146 ms and 2 ms respectively, which is equivalent to the exposure time at 100% brightness: 146/2+2=75 ms. Based on this, each of the pixel rows R1-R5 is equivalent to an exposure time of 75 ms at 100% brightness, so that the driving circuit 110 may capture a uniform fingerprint image.

Figure 12:
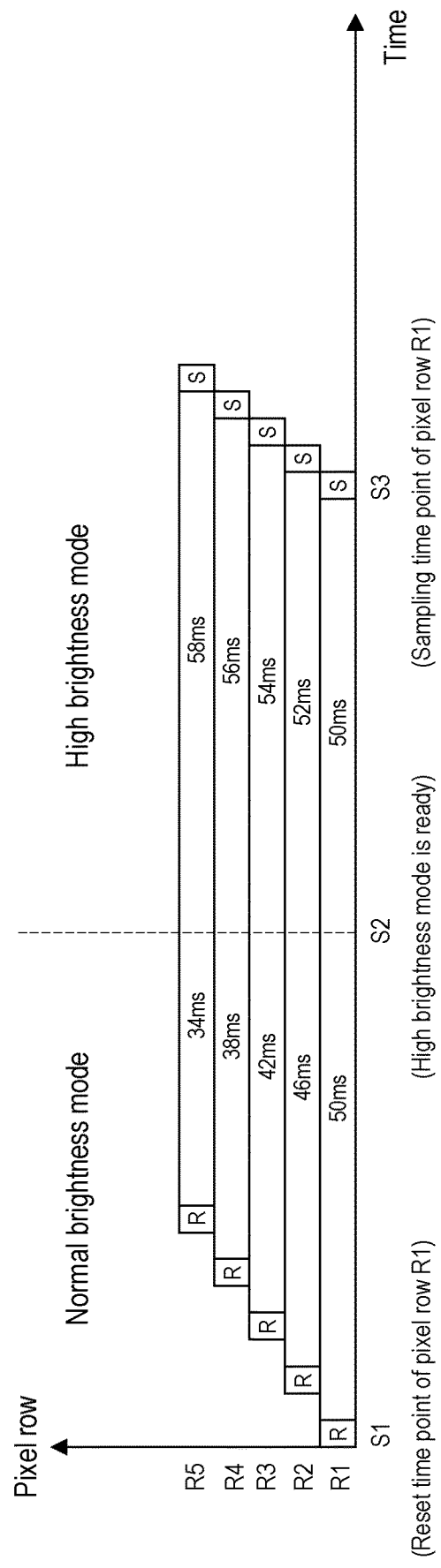
FIG. 12 is a schematic diagram of adaptively adjusting reset timings of the pixel rows according to an embodiment of the invention.

FIG. 12 is a schematic diagram of adaptively adjusting timings of the resets R of the pixel rows R1-R5 according to an embodiment of the invention. A horizontal axis of FIG. 12 represents time, and a vertical axis represents pixel row (image row). Description of the timing diagram shown in FIG. 12 may be deduced by referring to the related description of the timing diagram shown in FIG. 4, FIG. 5, or FIG. 8, and detail thereof is not repeated here. The pixel rows R1-R5 shown in FIG. 12 are respectively subjected to the reset R, an exposure period, and the sampling S in sequence to output sensing results of different rows. The resets R of the pixel rows R1-R5 are earlier than the mode switching time point S2, and the samplings S of the pixel rows R1-R5 are later than the mode switching time point S2. In the embodiment shown in FIG. 12, the timings of the resets R of the pixel rows R2-R5 may be adaptively adjusted based on the reset time point Si of the pixel row R1, so that the equivalent exposure times of each pixel row are as consistent as possible.

In the embodiment shown in FIG. 12, the brightness ratio K of the high luminance mode to the normal luminance mode is assumed to be 2. For example, the brightness of the high brightness mode is 100%, while the brightness of the normal brightness mode is 50%. The reset R of the pixel row R2 is later than the reset R of the pixel row R1 by K unit time, the reset R of the pixel row R3 is later than the reset R of the pixel row R2 by K unit time, the reset R of the pixel row R4 is later than the reset R of the pixel row R3 by K unit time, and the reset R of the pixel row R5 is later than the reset R of the pixel row R4 by K unit time. Here, one unit time may be a time length of the reset R and/or the sampling S. The sampling S of the pixel row R2 is later than the sampling S of the pixel row R1 by one unit time, and the sampling S of the pixel row R3 is later than the sampling S of the pixel row R2 by one unit time. The sampling S of the pixel row R4 is later than the sampling S of the pixel row R3 by one unit time, and the sampling S of the pixel row R5 is later than the sampling S of the pixel row R4 by one unit time.

Taking the pixel row R1 as an example, it is assumed that the exposure time before and after the mode switching time point S2 is 50 ms and 50 ms respectively, which is equivalent to the exposure time at 100% brightness: 50/2+50=75 ms. It is assumed here that one unit time is 2 ms. The reset S of the pixel row R2 shown in FIG. 12 is delayed by one unit time (K-1 unit time), so that the exposure time before and after the mode switching time point S2 is 46 ms and 52 ms respectively, which is equivalent to the exposure time at 100% brightness: 46/2+52=75 ms. For the remaining pixel rows R3-R5, reference may be made to the relevant description of the pixel row R2, as shown in FIG. 12. Based on this, each of the pixel rows R1-R5 is equivalent to an exposure time of 75 ms at 100% brightness, so that the driving circuit 110 may capture a uniform fingerprint image.

Figure 13:
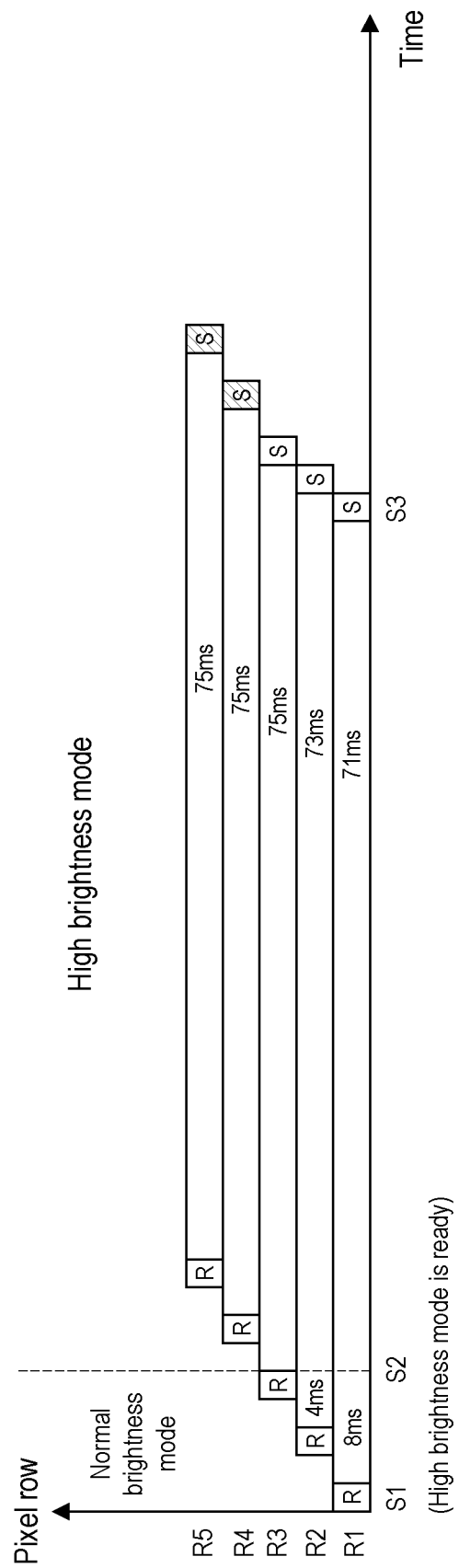
FIG. 13 is a schematic diagram of adaptively adjusting reset timings and sampling timings of the pixel rows according to yet another embodiment of the invention.

FIG. 13 is a schematic diagram of adaptively adjusting timings of the resets R and the samplings S of the pixel rows R1-R5 according to yet another embodiment of the invention. A horizontal axis of FIG. 13 represents time, and a vertical axis represents pixel row (image row). Description of the timing diagram shown in FIG. 13 may be deduced by referring to the related description of the timing diagram shown in FIG. 4, FIG. 5, FIG. 8 or FIG. 12, so that detail thereof is not repeated here. For the pixel rows R1-R5 shown in FIG. 13, reference may be made to the related description of the pixel rows R1-R5 shown in FIG. 12. The difference from the embodiment shown in FIG. 12 is that the resets R and the samplings S of the pixel rows R4-R5 shown in FIG. 13 are both later than the mode switching time point S2. In the embodiment shown in FIG. 13, the reset R of the pixel row R4 is later than the reset R of the pixel row R3 by two unit time (K unit time), the reset R of the pixel row R5 is later than the reset R of the pixel row R4 by two unit time, the sampling S of the pixel row R4 is later than the sampling S of the pixel row R3 by two unit time (K unit time), and the sampling S of the pixel row R5 is later than the sampling S of the pixel row R4 by two unit time.

Taking the pixel row R1 as an example, it is assumed that the exposure time before and after the mode switching time point S2 is 8 ms and 71 ms respectively, which is equivalent to the exposure time at 100% brightness: 8/2+71=75 ms. It is assumed here that one unit time is 2 ms, the brightness of the high brightness mode is 100%, and the brightness of the normal brightness mode is 50%. The reset R of the pixel row R2 shown in FIG. 13 is delayed by one unit time (K-1 unit time), so that the exposure time before and after the mode switching time point S2 is 4 ms and 73 ms respectively, which is equivalent to the exposure time at 100% brightness: 4/2+73=75 ms. For the pixel row R3, the exposure time before and after the mode switching time point S2 is 0 ms and 75 ms respectively, which is equivalent to the exposure time at 100% brightness: 0/2+75=75 ms. Since the resets R of the pixel rows R4-R5 are performed after the mode switching time point S2, the samplings S of the pixel rows R-R5 are also delayed by one unit time (K-1 unit time). Based on this, each of the pixel rows R1-R5 is equivalent to an exposure time of 75 ms at 100% brightness, so that the driving circuit 110 may capture a uniform fingerprint image.

Figure 14:
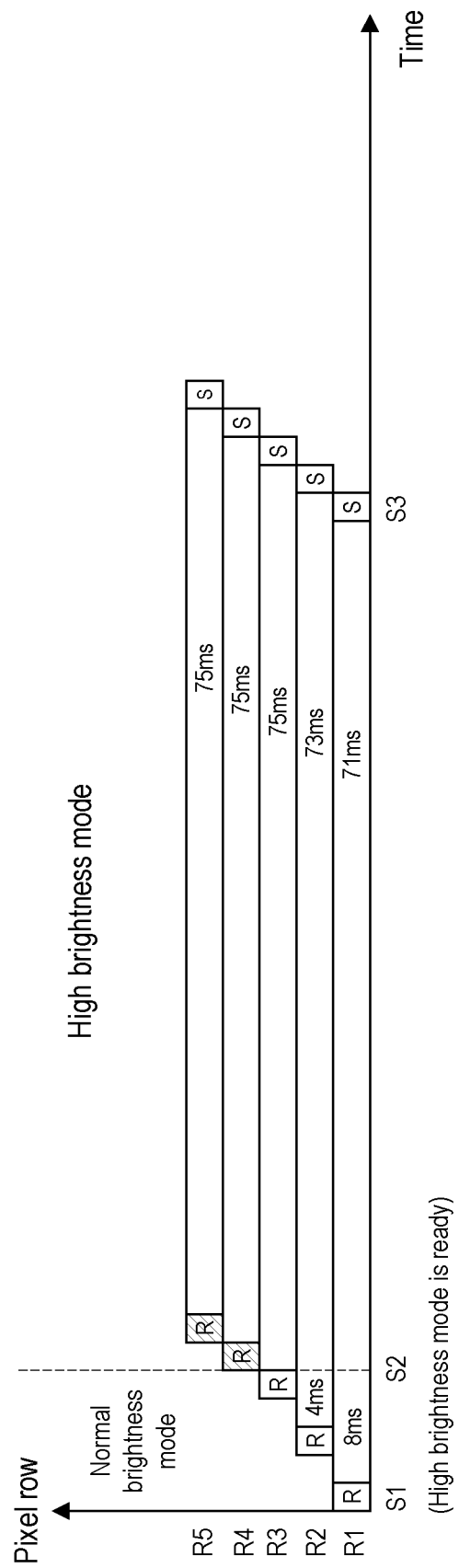
FIG. 14 is a schematic diagram of adaptively adjusting reset timings of the pixel rows according to another embodiment of the invention.

FIG. 14 is a schematic diagram of adaptively adjusting timings of the resets R of the pixel rows R1-R5 according to another embodiment of the invention. A horizontal axis of FIG. 14 represents time, and a vertical axis represents pixel row (image row). Description of the timing diagram shown in FIG. 14 may be deduced by referring to the related description of the timing diagram shown in FIG. 4, FIG. 5, FIG. 8 or FIG. 12, and detail thereof is not repeated here. For the pixel rows R1-R5 shown in FIG. 14, reference may be made to the related description of the pixel rows R1-R5 shown in FIG. 12. Different from the embodiment shown in FIG. 12, the reset R and the sampling S of the pixel rows R4-R5 shown in FIG. 14 are later than the mode switching time point S2. In the embodiment shown in FIG. 14, the reset R of the pixel row R4 is later than the reset R of the pixel row R3 by one unit time, and the reset R of the pixel row R5 is later than the reset R of the pixel row R4 by one unit time. The sampling S of the pixel row R4 is later than the sampling S of the pixel row R3 by one unit time, and the sampling S of the pixel row R5 is later than the sampling S of the pixel row R4 by one unit time.

Taking the pixel row R1 as an example, it is assumed that the exposure time before and after the mode switching time point S2 is 8 ms and 71 ms respectively, which is equivalent to the exposure time at 100% brightness: 8/2+71=75 ms. It is assumed here that one unit time is 2 ms, the brightness of the high brightness mode is 100%, and the brightness of the normal brightness mode is 50%. The reset R of the pixel row R2 shown in FIG. 14 is delayed by one unit time (K-1 unit time), so that the exposure time before and after the mode switching time point S2 is 4 ms and 73 ms respectively, which is equivalent to the exposure time at 100% brightness: 4/2+73=75 ms. For the pixel row R3, the exposure time before and after the mode switching time point S2 is 0 ms and 75 ms respectively, which is equivalent to the exposure time at 100% brightness: 0/2+75=75 ms. Since the pixel rows R4-R5 execute the reset R after the mode switching time point S2, the resets R and the samplings S of the pixel rows R4-R5 are not delayed. Based on this, each of the pixel rows R1-R5 is equivalent to an exposure time of 75 ms at 100% brightness, so that the driving circuit 110 may capture a uniform fingerprint image.

Figure 15:
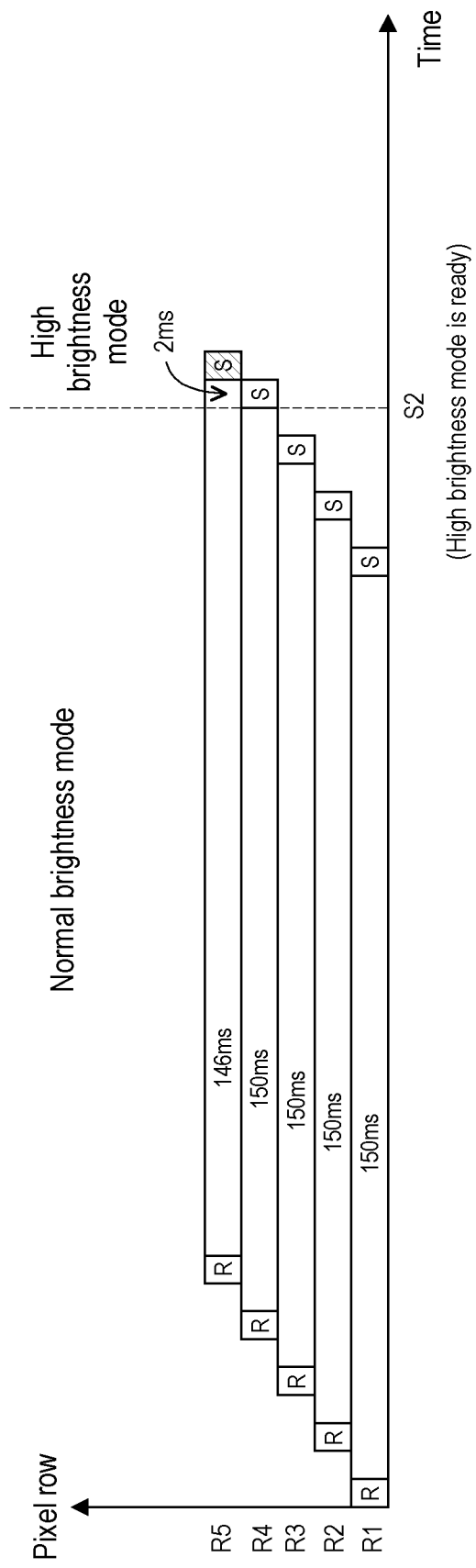
FIG. 15 is a schematic diagram of adaptively adjusting reset timings and sampling timings of the pixel rows according to still another embodiment of the invention.

FIG. 15 is a schematic diagram of adaptively adjusting timings of the resets R and the samplings S of the pixel rows R1-R5 according to still another embodiment of the invention. A horizontal axis of FIG. 15 represents time, and a vertical axis represents pixel row (image row). Description of the timing diagram shown in FIG. 15 may be deduced by referring to the related description of the timing diagram shown in FIG. 4, FIG. 5, FIG. 8, or FIG. 12, and detail thereof is not repeated here. For the pixel rows R1-R5 shown in FIG. 15, reference may be made to the related description of the pixel rows R1-R5 shown in FIG. 12. Different from the embodiment shown in FIG. 12, the resets R and the samplings S of the pixel rows R1-R3 shown in FIG. 15 are all earlier than the mode switching time point S2. In the embodiment shown in FIG. 15, the reset R of the pixel row R3 is earlier than the reset R of the pixel row R4 by two unit time (K unit time), the reset R of the pixel row R2 is earlier than the reset R of the pixel row R3 by two unit time. The reset R of the pixel row R1 is earlier than the reset R of the pixel row R2 by two unit time, the sampling S of the pixel row R3 is earlier than the sampling S of the pixel row R4 by two unit time (K unit time), the sampling S of the pixel row R2 is earlier than the sampling S of the pixel row R3 by two unit time, and the sampling S of the pixel row R1 is earlier than the sampling S of the pixel row R2 by two unit time. In the embodiment shown in FIG. 15, the timings of the samplings S of the pixel rows R2-R5 may be adaptively adjusted based on the sampling time point S3 of the pixel row R1, so that the equivalent exposure times of each pixel row are as consistent as possible.

Taking the pixel rows R1-R4 as an example, it is assumed that the exposure time before and after the mode switching time point S2 is 150 ms and 0 ms respectively, which is equivalent to the exposure time at 100% brightness: 150/2+ 0=75 ms. It is assumed here that one unit time is 2 ms, the brightness of the high brightness mode is 100%, and the brightness of the normal brightness mode is 50%. The reset S of the pixel row R5 shown in FIG. 15 is delayed by one unit time (K-1 unit time), but the sampling S of the pixel row R5 is not delayed, so that the exposure time before and after the mode switching time point S2 is 146 ms and 2 ms respectively, which is equivalent to the exposure time at 100% brightness: 146/2+2=75 ms. Based on this, each of the pixel rows R1-R5 is equivalent to an exposure time of 75 ms at 100% brightness, so that the driving circuit 110 may capture a uniform fingerprint image.

In summary, when a finger touches the fingerprint sensing panel 120, the driving circuit 110 in the above-mentioned embodiments may drive the fingerprint sensing panel 120, and switch the brightness mode of the fingerprint sensing panel 120 to facilitate fingerprint sensing. In general, it takes a while for the brightness mode to be switched from the normal brightness mode to the high brightness mode. The driving circuit 110 may sense the fingerprint in advance before the mode switching time point S2 (time point T3) of the brightness mode.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:
1. A fingerprint sensing device, comprising:
   a fingerprint sensing panel, configured to sense a fingerprint; and
   a driving circuit, coupled to the fingerprint sensing panel to detect whether a finger touch occurs on the fingerprint sensing panel, wherein
   the driving circuit controls the fingerprint sensing panel to switch a brightness mode of the fingerprint sensing panel from a normal brightness mode to a high brightness mode during a period of the finger touch, so as to sense the fingerprint,
   before a mode switching time point at which the brightness mode of the fingerprint sensing panel is switched to the high brightness mode, the driving circuit drives the fingerprint sensing panel to sense the fingerprint,
   the fingerprint sensing panel comprises a first pixel row, the first pixel row is subjected to a first reset, a first exposure period and a first sampling in sequence to output a first row sensing result, the first reset is earlier than the mode switching time point, and the first sampling is later than the mode switching time point.

2. The fingerprint sensing device as claimed in claim 1, wherein
   the driving circuit drives the fingerprint sensing panel to display a prompt light spot to prompt a fingerprint sensing region of the fingerprint sensing panel before the finger touch of the fingerprint sensing panel occurs; and
   the driving circuit drives the fingerprint sensing panel to display a fingerprint acquiring spot during the period of the finger touch, so as to sense the fingerprint.

3. The fingerprint sensing device as claimed in claim 1, wherein
   the driving circuit calculates Slope2=Slope1*K, wherein K is a brightness ratio between the high brightness mode and the normal brightness mode, Slope1 is a first slope of a relationship curve between an exposure time and a sensing code before the mode switching time point, the sensing code corresponds to the first row sensing result, and Slope2 is a second slope of the relationship curve after the mode switching time point; and
   the driving circuit calculates TCode=(S3−S2)*Slope2+ (S2−S1)*Slope1, wherein S1 is a time point of the first reset of the first pixel row, S2 is the mode switching time point, S3 is a sampling time point of the first sampling of the first pixel row, TCode is a target sensing code, and the target sensing code corresponds to a target exposure of the fingerprint sensing panel.

4. The fingerprint sensing device as claimed in claim 3, wherein
   the driving circuit drives at least one pixel row of the fingerprint sensing panel to sequentially perform a second reset and a plurality of second samplings to obtain a plurality of exposure sensing results before the mode switching time point; and
   the driving circuit calculates the first slope Slope1 by using the exposure sensing results.

5. The fingerprint sensing device as claimed in claim 1, wherein the fingerprint sensing panel further comprises a second pixel row adjacent to the first pixel row, the second pixel row is subjected to a second reset, a second exposure period and a second sampling in sequence to output a second row sensing result, a time point of the second reset is the same as a time point of the first reset, and a time point of the second sampling is the same as a time point of the first sampling.

6. The fingerprint sensing device as claimed in claim 1, wherein a brightness ratio between the high brightness mode and the normal brightness mode is K, the fingerprint sensing panel further comprises a second pixel row adjacent to the first pixel row, the second pixel row is subjected to a second reset, a second exposure period and a second sampling in sequence to output a second row sensing result, the second reset is earlier than the mode switching time point, the second reset is later than the first reset by one unit time, and the second sampling is later than the first sampling by 1/K unit time.

7. The fingerprint sensing device as claimed in claim 6, wherein the fingerprint sensing panel further comprises a third pixel row adjacent to the second pixel row, the third pixel row is subjected to a third reset, a third exposure period and a third sampling in sequence to output a third row sensing result, the third reset and the third sampling are both later than the mode switching time point, the third reset is later than the second reset by one unit time, and the third sampling is later than the second sampling by one unit time.

8. The fingerprint sensing device as claimed in claim 6, wherein the fingerprint sensing panel further comprises a third pixel row adjacent to the first pixel row, the third pixel row is subjected to a third reset, a third exposure period and a third sampling in sequence to output a third row sensing result, the third reset and the third sampling are earlier than the mode switching time point, the third reset is earlier than the first reset by one unit time, and the third sampling is earlier than the first sampling by one unit time.

9. The fingerprint sensing device as claimed in claim 1, wherein a brightness ratio between the high brightness mode and the normal brightness mode is K, the fingerprint sensing panel further comprises a second pixel row adjacent to the first pixel row, and the second pixel row is subjected to a second reset, a second exposure period and a second sampling in sequence to output a second row sensing result, the second reset is earlier than the mode switching time point, the second reset is later than the first reset by K unit time, and the second sampling is later than the first sampling by one unit time.

10. The fingerprint sensing device as claimed in claim 9, wherein the fingerprint sensing panel further comprises a third pixel row adjacent to the second pixel row, the third pixel row is subjected to a third reset, a third exposure period and a third sampling in sequence to output a third row sensing result, the third reset and the third sampling are both later than the mode switching time point, the third reset is later than the second reset by K unit time, and the third sampling is later than the second sampling by K unit time.

11. The fingerprint sensing device as claimed in claim 9, wherein the fingerprint sensing panel further comprises a third pixel row adjacent to the second pixel row, the third pixel row is subjected to a third reset, a third exposure period and a third sampling in sequence to output a third row sensing result, the third reset and the third sampling are both later than the mode switching time point, the third reset is later than the second reset by one unit time, and the third sampling is later than the second sampling by one unit time.

12. The fingerprint sensing device as claimed in claim 9, wherein the fingerprint sensing panel further comprises a third pixel row adjacent to the first pixel row, the third pixel row is subjected to a third reset, a third exposure period and a third sampling in sequence to output a third row sensing result, the third reset and the third sampling are earlier than the mode switching time point, the third reset is earlier than the first reset by K unit time, and the third sampling is earlier than the first sampling by K unit time.

13. A driving method of a fingerprint sensing panel, comprising:
    detecting whether a finger touch occurs on the fingerprint sensing panel;
    during a period of the finger touch, switching a brightness mode of the fingerprint sensing panel from a normal brightness mode to a high brightness mode so as to sense a fingerprint; and
    driving the fingerprint sensing panel to sense the fingerprint before a mode switching time point at which the brightness mode of the fingerprint sensing panel is switched to the high brightness mode, wherein the fingerprint sensing panel comprises a first pixel row, the first pixel row is subjected to a first reset, a first exposure period and a first sampling in sequence to output a first row sensing result, the first reset is earlier than the mode switching time point, and the first sampling is later than the mode switching time point.

14. The driving method of the fingerprint sensing panel as claimed in claim 13, further comprising:
    driving the fingerprint sensing panel to display a prompt light spot to prompt a fingerprint sensing region of the fingerprint sensing panel before the finger touch of the fingerprint sensing panel occurs; and
    driving the fingerprint sensing panel to display a fingerprint acquiring spot during the period of the finger touch, so as to sense the fingerprint.

15. The driving method of the fingerprint sensing panel as claimed in claim 13, further comprising:
    calculating Slope2=Slope1*K, wherein K is a brightness ratio between the high brightness mode and the normal brightness mode, Slope1 is a first slope of a relationship curve between an exposure time and a sensing code before the mode switching time point, the sensing code corresponds to the first row sensing result, and Slope2 is a second slope of the relationship curve after the mode switching time point; and
    calculating TCode=(S3−S2)*Slope2+(S2−S1)*Slope1, wherein S1 is a time point of the first reset of the first pixel row, S2 is the mode switching time point, S3 is a sampling time point of the first sampling of the first pixel row, TCode is a target sensing code, and the target sensing code corresponds to a target exposure of the fingerprint sensing panel.

16. The driving method of the fingerprint sensing panel as claimed in claim 15, further comprising:
    driving at least one pixel row of the fingerprint sensing panel to sequentially perform a second reset and a plurality of second samplings to obtain a plurality of exposure sensing results before the mode switching time point; and
    calculating the first slope Slope1 by using the exposure sensing results.

17. The driving method of the fingerprint sensing panel as claimed in claim 13, wherein the fingerprint sensing panel further comprises a second pixel row adjacent to the first pixel row, the second pixel row is subjected to a second reset, a second exposure period and a second sampling in sequence to output a second row sensing result, a time point of the second reset is the same as a time point of the first reset, and a time point of the second sampling is the same as a time point of the first sampling.

18. The driving method of the fingerprint sensing panel as claimed in claim 13, wherein a brightness ratio between the high brightness mode and the normal brightness mode is K, the fingerprint sensing panel further comprises a second pixel row adjacent to the first pixel row, the second pixel row is subjected to a second reset, a second exposure period and a second sampling in sequence to output a second row sensing result, the second reset is earlier than the mode switching time point, the second reset is later than the first reset by one unit time, and the second sampling is later than the first sampling by 1/K unit time.

19. The driving method of the fingerprint sensing panel as claimed in claim 18, wherein the fingerprint sensing panel further comprises a third pixel row adjacent to the second pixel row, the third pixel row is subjected to a third reset, a third exposure period and a third sampling in sequence to output a third row sensing result, the third reset and the third sampling are both later than the mode switching time point, the third reset is later than the second reset by one unit time, and the third sampling is later than the second sampling by one unit time.

20. The driving method of the fingerprint sensing panel as claimed in claim 18, wherein the fingerprint sensing panel further comprises a third pixel row adjacent to the first pixel row, the third pixel row is subjected to a third reset, a third exposure period and a third sampling in sequence to output a third row sensing result, the third reset and the third sampling are earlier than the mode switching time point, the third reset is earlier than the first reset by one unit time, and the third sampling is earlier than the first sampling by one unit time.

21. The driving method of the fingerprint sensing panel as claimed in claim 13, wherein a brightness ratio between the high brightness mode and the normal brightness mode is K, and the fingerprint sensing panel further comprises a second pixel row adjacent to the first pixel row, and the second pixel row is subjected to a second reset, a second exposure period and a second sampling in sequence to output a second row sensing result, the second reset is earlier than the mode switching time point, the second reset is later than the first reset by K unit time, and the second sampling is later than the first sampling by one unit time.

22. The driving method of the fingerprint sensing panel as claimed in claim 21, wherein the fingerprint sensing panel further comprises a third pixel row adjacent to the second pixel row, the third pixel row is subjected to a third reset, a third exposure period and a third sampling in sequence to output a third row sensing result, the third reset and the third sampling are both later than the mode switching time point, the third reset is later than the second reset by K unit time, and the third sampling is later than the second sampling by K unit time.

23. The driving method of the fingerprint sensing panel as claimed in claim 21, wherein the fingerprint sensing panel further comprises a third pixel row adjacent to the second pixel row, the third pixel row is subjected to a third reset, a third exposure period and a third sampling in sequence to output a third row sensing result, the third reset and the third sampling are both later than the mode switching time point, the third reset is later than the second reset by one unit time, and the third sampling is later than the second sampling by one unit time.

24. The driving method of the fingerprint sensing panel as claimed in claim 21, wherein the fingerprint sensing panel further comprises a third pixel row adjacent to the first pixel row, the third pixel row is subjected to a third reset, a third exposure period and a third sampling in sequence to output a third row sensing result, the third reset and the third sampling are earlier than the mode switching time point, the third reset is earlier than the first reset by K unit time, and the third sampling is earlier than the first sampling by K unit time.

* * * * *